I. D. BATE.
ATTACHMENT FOR THRESHING MACHINE FEEDERS.
APPLICATION FILED NOV. 1, 1911.

1,104,033.

Patented July 21, 1914.

UNITED STATES PATENT OFFICE.

IRA D. BATE, OF WEST JEFFERSON, OHIO.

ATTACHMENT FOR THRESHING-MACHINE FEEDERS.

1,104,033.  Specification of Letters Patent. Patented July 21, 1914.

Application filed November 1, 1911. Serial No. 657,914.

*To all whom it may concern:*

Be it known that I, IRA D. BATE, a citizen of the United States, residing at West Jefferson, in the county of Madison and State of Ohio, have invented certain new and useful Improvements in Attachments for Threshing-Machine Feeders, of which the following is a specification.

My invention pertains to an attachment for threshing machine feeders and is particularly designed to render unnecessary the provision of what is generally known as the center board. This center board is commonly used in connection with the endless feeder aprons and is particularly intended to prevent the throwing of bundles of grain entirely over the feeder, the action being the stopping of the bundle and causing it to drop directly upon the feeder apron. They are further designed to cause the bundles of grain to pass into the cylinder head-first instead of cross-wise. Center boards of this type are cumbersome and not permanently adaptable to foldable feeders.

My invention aims to provide a permanent attachment for feeders and such an attachment that will be readily adaptable to foldable feeders and will readily fold with such feeders. While this is the preferred form of my invention, it is not absolutely necessary to its fulfilment to provide a foldable structure, as its chief function is to prevent the entrance of sheaves of grain crosswise into the threshing cylinder. Likewise, if it is so desired, the attachment may be made to occupy a portion of the space above the rattler and below the center board, if it is desired to use a center board, it being understood that my invention extends into proximity to the cylinder to cause tilting of the sheaves, as will be hereinafter described.

The preferred form of my invention is shown in the accompanying drawings, in which similar characters of reference designate corresponding parts, and in which—

Figure 1:
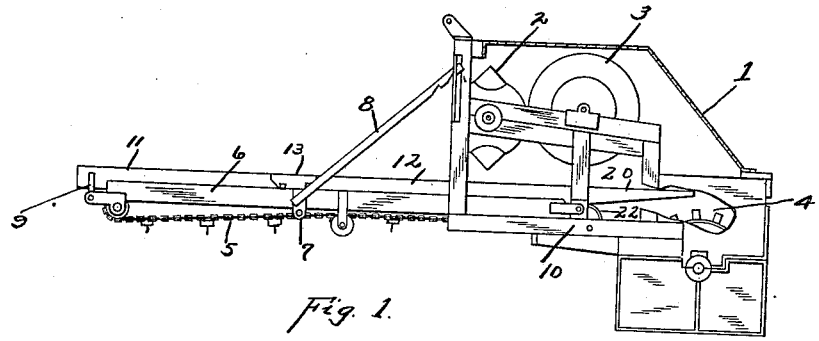
Figure 2:
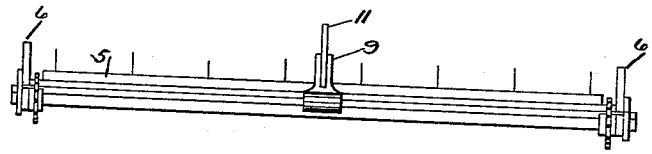
Figure 3:
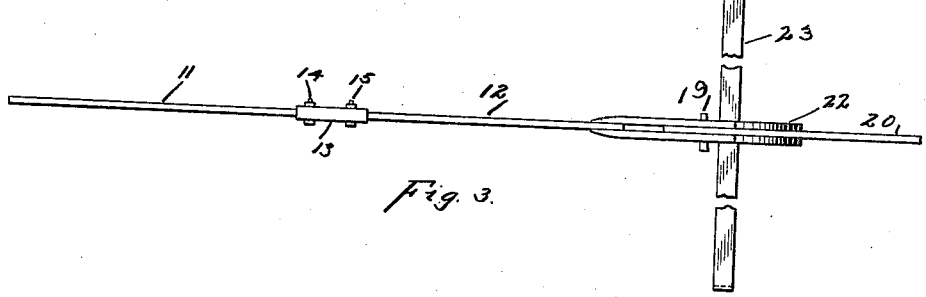
Figure 4:
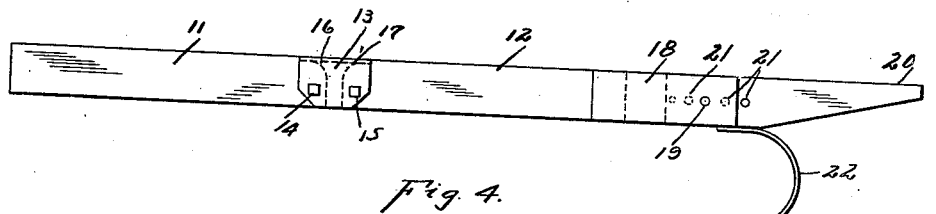

Figure 1 is a vertical longitudinal section showing my attachment applied to a threshing machine and feeder, Fig. 2 is an enlarged end view of a feeder with my attachment applied thereto, Fig. 3 is a top plan view of my feeder attachment added, and, Fig. 4 is a side elevation thereof.

In the drawings I have shown the common construction of a threshing machine comprising the casing 1, band cutter knives 2, spreading blades 3 and cylinder 4. In conjunction therewith I have disclosed a common form of endless feeder 5 carried upon framework 6 hinged as at 7 for a downward and an inward fold. The frame is adjustably braced in a substantially horizontal position by brace rods 8.

My attachment is desirably sustained in place by the mounting of one end in the center board holder 9 and supporting the other end from the cheek boards 10. The structural characteristics of my attachment are comparatively simple and comprise a low central bar desirably formed sectional by the members 11 and 12 which are connected by a double hinge connection in the form of a U-shaped metallic element 13 pivotally secured to such members 11 and 12 by bolts 14 and 15 respectively. It will be noted that these members 11 and 12 have their adjacent extremities rounded as at 16 and 17 to afford sufficient leeway for folding movement. The inner end of the member 12 is desirably bifurcated as at 18 and provided as at 19 with alining apertures. Fitting within this bifurcated end 18 is an extension element or finger 20 provided with suitably disposed apertures 21 to permit of longitudinal adjustment of such finger in the bifurcation. The inner extremity of this member 12 is further provided upon its under surface with a bowed member 22 desirably of metal and carrying upon its lower extremity a cross piece 23.

In application, the member 11 is mounted in the center board holder and the member 23 is supported at either end from the cheek boards 10. This support is so located as to cause the bowed member 22 to embrace the inner extremity of the feeder. The finger 20 thus extends into juxtaposition with the cylinder and the relative distance between the cylinder and this finger may be regulated by the adjustable structure.

In operation of my invention after attachment, it will be apparent that any bundle of grain thrown upon the feeder crosswise will have its end grasped by the traveling feeder apron and will be gradually drawn into position upon one side or the other of the members 11 and 12. Thus there is practically no possibility of any bundle of grain entering the thresher crosswise.

The importance of my invention resides in the provision of such a structure of attachment for threshing machine feeders that there will be a positive and unfailing movement of the bundle of grain into proper approaching position to such cylinder regardless of the manner of approach of the bundle of grain thereto. In other words, the extension element or finger of my attachment extends to within a short distance of the cylinder and beyond the end of the rattler. The grain passes off of the end of the rattler which is normally within about eighteen or twenty inches from the cylinder and passes on to the finger extension. It then necessarily tilts in one direction or other and in so doing one end or the other of the bundle is positively drawn between the cylinder and its concaves by the natural suction thereof. In this manner I have produced a positive preventative of "slugging" of the cylinder in any manner regardless of the condition of the grain. This is equally true regardless of the way in which bundles are pitched on to the rattler and regardless of any position they might assume in their travel along the rattler and approach to the cylinder.

What I claim is—

1. In combination with a threshing machine having a feeder, cylinder and concave, an attachment for said feeder comprising a low central bar mounted on the body of said feeder and adjustable to bring its inner end past the inner edge of said feeder and into proximity to said cylinder and concave.

2. In combination with a threshing machine having a feeder and cylinder, an attachment for said feeder comprising a low central bar and an adjustable finger secured to the inner end of said bar extending into juxtaposition to said cylinder.

3. In combination with a threshing machine having a feeder and cylinder, an attachment for said feeder comprising a low central bar extending into juxtaposition to said cylinder, a bowed supporting element for said bar embracing the inner end of said feeder, and a supporting member for said element.

4. In combination with a threshing machine having a feeder and cylinder, an attachment comprising, in combination with a sectional framework foldable downwardly and inwardly, a low central bar extending into juxtaposition to said cylinder, and a hinge structure forming a connection between the sections of said bar and facilitating its folding under with the outer section of said feeder.

5. In combination with a threshing machine having a feeder, cylinder and concave, an attachment comprising a low central bar, a finger on the inner end of said bar and adapted to extend into juxtaposition to said cylinder and concave, whereby bundles of grain are directed endwise into the space between said cylinder and concave.

In testimony whereof I affix my signature in presence of two witnesses.

IRA D. BATE.

Witnesses:
WALTER E. L. BOCK,
A. L. PHELPS.